United States Patent [19]

Starks et al.

[11] 3,899,542

[45] Aug. 12, 1975

[54] PREPARATION OF ALKYL HALIDES

[75] Inventors: Charles M. Starks, Ponca City, Okla.; Ronnie D. Gordon, Richardson, Tex.

[73] Assignee: Continental Oil Company, Ponca City, Okla.

[22] Filed: Mar. 10, 1972

[21] Appl. No.: 233,769

Related U.S. Application Data

[63] Continuation-in-part of Ser. No. 10,045, Feb. 9, 1970, abandoned.

[52] U.S. Cl. ............................................ 260/658 R
[51] Int. Cl. ............................................ C07c 17/20
[58] Field of Search ............ 260/658 R, 648 C, 653

[56] References Cited
UNITED STATES PATENTS 3,641,172  2/1972  Johnson et al. ................. 260/658 R 3,725,458  4/1973  Starks ............................ 260/658 R

FOREIGN PATENTS OR APPLICATIONS 535,728  4/1973  Switzerland .................... 260/658 R

OTHER PUBLICATIONS

Calingaert et al., JACS, 62, pp. 1545–1547, QD1A5.
Starks, Phase Transfer Catalysis, JACS, 93:1, pp. 195–199 (Jan. 13, 1971).

*Primary Examiner*—Delbert E. Gantz
*Assistant Examiner*—Joseph A. Boska
*Attorney, Agent, or Firm*—Ronald J. Carlson

[57]            ABSTRACT

Alkyl halides are produced by an exchange reaction wherein a halo-hydrocarbon is contacted with a different halo-hydrocarbon in the presence of an organic quaternary salt catalyst.

5 Claims, No Drawings

PREPARATION OF ALKYL HALIDES

CROSS-REFERENCES TO RELATED APPLICATIONS

This is a continuation-in-part of our application filed Feb. 9, 1970, under U.S. Ser. No. 10,045, now abandoned, for "Preparation of Alkyl Halides."

BACKGROUND OF THE INVENTION

1. Field of the Invention

This invention relates to a halogen exchange process. In one aspect this invention relates to a novel catalyst system for a halogen exchange process. In another aspect this invention relates to the production of alkyl halides by an exchange reaction wherein the halogen constituent of a halogen substituted hydrocarbon is exchanged with a different halogen constituent of another halogen substituted hydrocarbon in the presence of an organic quaternary salt catalyst.

2. Brief Description of the Prior Art

Alkyl halides have become increasingly important as intermediates in the preparation of valuable chemical compounds. For example, alkyl chlorides have been employed as intermediates in the preparation of primary alcohols which are then converted into surface active agents and incorporated into biodegradable detergents.

There are many instances where it would be desirable to prepare an alkyl halide having a specific alkyl and/or halide constituent. For instance, it is often desirable to halogenate an alkane with one halogen and thereafter substitute the halogen of the resulting halo-alkane with a different halogen to take advantage of the particular characteristics of each of the halogens. This process is known as a halogen exchange process.

However, the prior art methods of halogen exchange have often employed a solvent medium, such as dimethyl formamide, which has created problems as to solvent recovery and thus the process has not offered an attractive commercial process for halogen exchange. In addition, other prior art methods have been limited to specific alkyl constituents and thus have not offered a flexible halogen exchange process. Thus, a need has long been felt for a halogen exchange process which was commercially attractive and which provided for direct synthesis of the desired alkyl halide from readily available or easily prepared materials.

OBJECTS OF THE INVENTION

An object of the present invention is to produce alkyl halides by a halogen exchange reaction process. Another object of the invention is to provide an improved halogen exchange reaction system wherein the halogen constituent of a halogen substituted hydrocarbon can be effectively and efficiently exchanged with a different halogen constituent of another halogen substituted hydrocarbon. Another object of the present invention is to provide an improved halogen exchange reaction process which does not require the use of a solvent medium and which is applicable for the synthesis of a wide variety of alkyl halides. These and other objects, advantages, and features of the present invention will become apparent to those skilled in the art from a reading of the following detailed description and appended claims.

SUMMARY OF THE INVENTION

According to the present invention we have found a novel catalyst system for use in a halogen exchange system wherein the halogen constituent of a liquid halogen substituted hydrocarbon can be effectively and efficiently exchanged with a different halogen constituent of another liquid halogen substituted hydrocarbon. Further, according to the present invention we have found a process for the production of a variety of alkyl halides wherein a readily available alkyl halide can be converted to a different alkyl halide which is not as widely available by carrying out the halogen exchange reaction in the presence of an organic quaternary salt catalyst. Further, according to the invention, we have found a process for the production of alkyl halides by a halogen exchange reaction system which is carried out in the absence of a solvent medium.

DESCRIPTION OF THE PREFERRED EMBODIMENTS

In the production of alkyl halides by an exchange reaction employing liquid reactants we have now found that said exchange reaction can be carried out effectively and efficiently when same is conducted in the presence of an organic quaternary salt catalyst. Basically, the process involves the exchange of the halogen constituent of one halogen substituted hydrocarbon with a different halogen constituent of a second halogen substituted hydrocarbon. The halogen substituted hydrocarbon employed in the exchange reaction can be any suitable halogen substituted alkyl hydrocarbon which is in its liquid state at the desired reaction conditions and in which the alkyl portion contains from one to about 30 carbon atoms per molecule. The term alkyl as used herein encompasses primary alkyls, secondary alkyls, tertiary alkyls and cyclo alkyls. Halogen substituted hydrocarbon which can be treated in accordance with the process of the present invention include such compounds as ethyl chloride, propyl chloride, isopropyl chloride, 1,1-dichloropropane, 1,2-dichloropropane, 1,3-dichloropropane, 2,3-dichloropropane, butylbromide, 1,4-dichlorobutane, tert-butylchloride, amylchloride, tert-amylchloride, 2-chloropentane, 3-chloropentane, 1,5-dichloropentane, 1-chloro-8-iodoctane, 1-chloro-6-cyanohexane, cyclopentylchloride, cyclohexylchloride, 11-chloroundecanoic acid, chlorinated dodecane, chlorinated tetradecane, chlorinated eicosane, chlorinated pentacosane, chlorinated triacontane, isooctylchloride, 5-chloro-5-methyl decane, 9-chloro-9-ethyl-6-methyl eiscosane, benzylic halides, such as benzyl chloride and $\alpha,\alpha'$dichloro xylene, chlorinated alkyl benzene wherein the alkyl radical contains from about 10 to 15 carbon atoms, and the like as well as the corresponding bromine, fluorine and iodine substituted hydrocarbons. The process employed in the present invention is particularly useful to affect chlorine-bromine exchange.

The temperature at which the halogen exchange reaction can be affected can vary widely. The temperature range will depend upon the particular organic quaternary salt catalyst employed as well as the halogen substituted hydrocarbons. Normally, the organic quaternary salt catalyst is not limited except by its stability at reaction temperatures. By selecting the proper organic quaternary salt catalyst and the halogen substituted organic compounds one can vary the temperature range broadly, generally from about 0° to 200°C. However, when employing organic quaternary salt catalyst having an alkyl radical containing 1 to 3 carbon atoms, the reaction shall be conducted below about 70°C. to prevent decomposition of the quaternary salt catalyst. As previously stated, when the halogen exchange reaction is carried out in the presence of an organic quaternary salt catalyst no solvent medium is required. Thus, the halogen substituted organic compounds are in their liquid state as the desired reaction conditions. When employing elevated temperatures, or, if or more of the reactants exist under normal atmospheric conditions in their gaseous state, one can, by employing elevated pressure, maintain the reactants in their liquid state during the reaction.

The organic quaternary salt catalyst employed in the practice of the present invention can be any suitable organic quaternary salt having the general formula

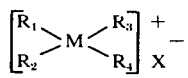

wherein M is a pentavalent ion of an element selected from the group consisting of nitrogen, phosphorous, arsenic, antimony and bismuth, $R_1$, $R_2$, $R_3$, and $R_4$ are alkyl groups containing from 1 to about 30 carbon atoms, and X is a conventional anion derived from an organic or inorganic acid, including halides, sulfates, sulfonates and acetates. Normally, it is desirable that the alkyl substituents $R_1$, $R_2$, $R_3$, and $R_4$ contain more than a single carbon atom. Examples of suitable organic quaternary salts which can be employed as the catalyst for the exchange reaction described hereinbefore are: hexadecyltrihexylammonium bromide; trioctylethylammonium bromide; tridecylmethylammonium chloride; didodecyldimiethylammonium chloride; tetraheptylammonium iodide; dioctadecyldimethyl ammonium chloride; tridecylbenzylammonium chloride; tributyldecylphosphonium iodide; tripehnyldecylphosphonium iodide; tributylhexadecylphosphonium iodide; tricaprylyldodecylammonium p-toluene sulfonate; tribenzyldecylarsonium chloride; tetranonylammonium hydroxide; N,N,N',N'-tetramethyl-N,N'-ditetradecyl-p-xylene-$\alpha,\alpha'$-diammonium dichloride; 1-methyl-1-(N-octadecanonyl-2-aminoethyl)-2-heptadecyl-4,5-dihydro-1,3-diazole methylsulfonate; N,N,N',N'-tetramethyl-N,N'-dioctadecyl-x-dodecyl-y-xylene-$\alpha,\alpha'$-diammonium chloride.

The process of this invention can be effected by any conventional or otherwise convenient method and may comprise a batch or a continuous type of operation. However, for simplicity the process of the invention will be described in detail as it pertains to a batch type operation.

In a batch type operation for the production of alkyl halides by an exchange reaction from about 50 to 90 weight percent of a halogen substituted alkyl hydrocarbon is charged to a reactor with from about 1 to 50 weight percent of a second halogen substituted alkyl hydrocarbon and from about 0.01 to 10 weight percent of an organic quaternary salt catalyst. The resulting mixture is then agitated and maintained at a temperature within the range of about 0° to 200°C. for a period of time effective to exchange the halogen constituent of the first halogen substituted alkyl hydrocarbon with the halogen constituent of the second halogen substituted alkyl hydrocarbon or until equilibrium conditions are obtained in the halogen exchange reaction. Once the reaction is completed the reaction mixture is withdrawn and the desired halogen substituted alkyl halide separated from the remainder of the reaction by any suitable means, such as distillation, which are well known in the art.

The following examples are presented in illustration of the halogen exchange reaction catalyst and process of the present invention. However, it is to be understood that such examples are for illustrative purposes only and are not to be construed as limitations on the scope of the invention as set out in the appended claims.

EXAMPLE I

Experiment was conducted involving the halogen exchange reaction in which ethyl chloride and butyl bromide were employed as the halogen substituted alkyl hydrocarbon. In one experiment tetradodecyl ammonium bromide was employed as the organic quaternary salt catalyst and in another tri-n-butyl-octadecyl phosphonium bromide was employed as the catalyst. The procedure followed in these experiments is set out in more detail hereinbelow. 0.4 mole of ethyl chloride, 0.4 mole of butyl bromide and 0.5 gram of tetradodecyl ammonium bromide were charged to a 200 ml autoclave. The autoclave containing the reactants was heated to a temperature of about 110°. The reaction was allowed to progress until equilibrium conditions were achieved which was determined by analysis of samples taken periodically which were analyzed by gas chromatography.

A second series of runs were conducted employing the same procedure described above except that tri-n-butyloctadecyl phosphonium bromide was employed as the catalyst. In each of the above experiments analyses by gas chromatography revealed that an equilibrium reaction occurred in which, at equilibrium conditions, equal molar amounts of ethyl chloride, ethyl bromide, butyl chloride, and butyl bromide were produced.

Kinetic studies of the exchange reaction show that it is a pseudo-first-order reaction with a rate constant of $1.5 \times 10^{-5}$ sec$^{-1}$ for ethyl chloride-butyl bromide exchange at 110°C. Similar kinetic studies at 110°C. show that an $n$-fold increase in catalyst increases the reaction rate by a factor of $n$.

EXAMPLE II

An experiment was conducted to study the exchange of alkyl bromides and alkyl iodies. Equal amounts, 0.4 mole, of ethyl iodide and butyl bromide were admixed with about 0.5 gram of tri-n-butyloctadecyl phosphonium bromide in a 100 ml autoclave and the resulting mixture was heated to 110°C. The reaction rate was very rapid at this temperature with the reaction going to an equilibrium condition, i.e., the formation of equal molar amounts of ethyl iodide, ethyl bromide, butyl bromide, and butyl iodide in about 10 minutes.

The above examples clearly demonstrated the preparation of alkyl halides of the present invention wherein a halo-hydrocarbon is contacted with a different halo-hydrocarbon in the presence of an organic quaternary salt catalyst. However, it is to be understood that the exchange reaction described in the above examples is not limited by the choice of starting alkyl halides set forth in the examples. The alkyl halides employed in the practice of the invention can be any suitable alkyl halide having from 1 to about 30 carbon atoms as previously described in the foregoing specification.

Having thus described the invention, we claim:

1. In a halogen exchange process wherein a halogen of a first liqiud halogen substituted alkane is exchanged with a different halogen of a second liquid halogen substituted alkane, said halogen being chlorine, bromine or iodine, the improvement comprising utilizing as the catalyst an organic quaternary salt having the general formula

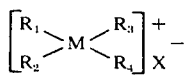

wherein M is nitrogen or phosphorous; $R_1$, $R_2$, $R_3$, and $R_4$ are alkyl groups containing from 1 to about 30 carbon atoms respectively; and X is halide, sulfate, hydrocarbon sulfonate, or acetate.

2. The process of claim 1 wherein said catalyst is tri-n-butyl-octadecyl phosphonium bromide.

3. A process for exchanging a halogen of a first liquid halogen substituted alkane with a different halogen of a second liquid halogen substituted alkane, said halogen being chlorine, bromine or iodine, which comprises:
   a. forming a liquid reaction mixture consisting essentially of about 50 to 90 weight percent of said first liquid halogen substituted alkane, about 1 to 50 weight percent of said second liquid halogen substituted alkane, and about 0.01 to 10 weight percent of an organic quaternary salt catalyst, said organic quaternary salt having the formula

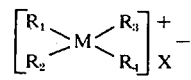

wherein M is a pentavalent ion of nitrogen or phosphorus; each of $R_1$, $R_2$, $R_3$, and $R_4$ is an alkyl group containing 1 to 30 carbon atoms; and X is halide, sulfate, hydrocarbon sulfonate or acetate,
   b. subjecting said liquid reaction mixture to temperatures in the range of about 0° to 200°C for a period of time sufficient to allow halogen exchange; and
   c. recovering the desired halogen substituted alkane.

4. The process according to claim 3 wherein one of said $R_1$, $R_2$, $R_3$, and $R_4$ of said organic quaternary salt catalyst contains from about 1 to 3 carbon atoms per alkyl group and said process is carried out at a temperature below about 70°C.

5. In a halogen exchange process wherein a halogen of a fist liquid halogen substituted alkane is exchanged with a different halogen of a second liquid halogen substituted alkane, said halogen being chlorine, bromine or iodine, the improvement comprising utilizing tetradodecyl ammonium bromide as the catalyst.

* * * * *